W. WILSON.

Collar.

No. 8,169. Reissued April 9, 1878.

WITNESSES:

Gustave Dieterich

C. Sedgwick

INVENTOR:

W. Wilson

BY Munn & Co.

ATTORNEYS.

UNITED STATES PATENT OFFICE.

WASHINGTON WILSON, OF NEW YORK, N. Y.

IMPROVEMENT IN COLLARS.

Specification forming part of Letters Patent No. 197,807, dated December 4, 1877; Reissue No. 5,169, dated April 9, 1878; application filed March 11, 1878.

*To all whom it may concern:*

Figure 1:
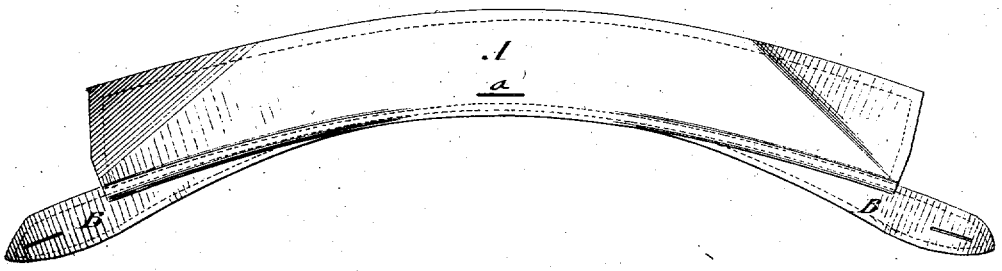
Figure 2:
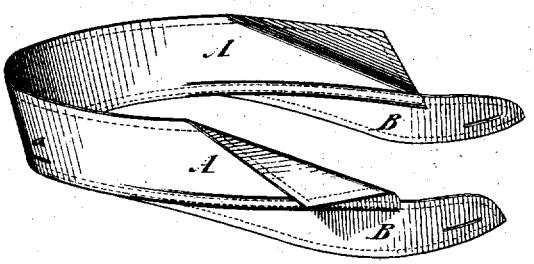

Be it known that I, WASHINGTON WILSON, of the city, county, and State of New York, have invented a new and Improved Collar, of which the following is a specification:

In the accompanying drawings, Figure 1 represents a side elevation of my improved collar, and Fig. 2 a perspective view of the same.

Similar letters of reference indicate corresponding parts.

This invention refers to an improved standing collar, that retains all the advantages of the old-style curved band, without the objection of springing the collar too far from the neck, so as to come in contact with the coat and soil the collar. The collar also hugs the neck-band in such a manner that the collar is prevented from overriding it, resulting in a more comfortable fit.

The invention consists of a standing or other collar, having curved and graduated bands that extend along the lower edge of the collar, either from the center of the collar, or from any other point between center and ends, to and beyond the ends of the collar. The rear button-hole is thrown into the top or body of the collar above the band or binding of the same.

Referring to the drawings, A represents a standing or other collar of my improved construction, and B the curved and graduated bands, which extend from the center of the collar or any other point between the center and ends, and continue along the lower part of the top or body of the collar, with a graduated curve and increasing width, to and beyond the ends of the collar, the ends being curved in the same manner as in ordinary bands.

The bands B are made either to overlap the collar proper, or the collar is made to overlap the bands; or one part of the bands laps over the collar ends, while the remaining part is overlapped by the collar, so as to obtain smoothly-covered joints at both meeting ends of collar and graduated bands.

The bead or binding formed by the connection of collar and band may also be continued, if desired, along the lower edge of that part of the collar-body between the bands, so as to connect the graduated bands, and impart thereby a more ornamental appearance to the collar.

The rear button-hole *a* is arranged in the top or body of the collar above the bead or binding at the lower edge of the same, which position of the button-hole, in connection with the graduated bands, produces a collar that hugs the neck-band in superior manner without springing back, so as to come in contact with the coat-collar. The shorter graduated bands produce also a considerable saving of material as compared to the old style of continuous band, that extends at uniform width along the lower part of the collar.

Having thus described my invention, I claim as new and desire to secure by Letters Patent—

1. A collar provided with a band composed of the parts B B, curved and tapered, or decreasingly graduated from the ends toward the middle, as shown and described.

2. A collar having short or sectional bands starting from the center of the collar, or any point between the center and ends thereof, and continuing with a graduated curve to and beyond the ends of the same, substantially as and for the purpose set forth.

3. The combination, with a collar having short bands graduated on a curve and decreasingly toward the middle, of a band-connecting bead or binding along the lower edge, as set forth.

4. A collar having curved and graduated bands that extend along the top or body of the collar from the center, or any other point between the center and ends thereof, to and beyond the ends of the collar, and having the rear button-hole placed above the band or binding into the top or body of the collar, substantially as shown and described.

WASHINGTON WILSON.

Witnesses:

PAUL GOEPEL,

C. SEDGWICK.